United States Patent [19]
Powanda et al.

[11] 3,802,955
[45] Apr. 9, 1974

[54] AMINOPLAST-FORMALDEHYDE REACTION PRODUCTS AS LAMINATING RESINS

[75] Inventors: Thomas H. Powanda, Middlesex; William Lindlaw, deceased, late of Westfield, N.J. by Jean Lindlaw, executrix

[73] Assignee: Celanese Corporation, New York, N.Y.

[22] Filed: July 12, 1972

[21] Appl. No.: 270,890

[52] U.S. Cl.............. 161/263, 117/155 R, 161/41, 161/270, 161/413, 161/257, 161/258, 161/259, 260/67.6 R
[51] Int. Cl........................................... B32b 27/10
[58] Field of Search.......... 260/67.6 R; 161/41, 413, 161/247, 250, 251, 270; 117/155 R

[56] References Cited
UNITED STATES PATENTS
3,361,617   1/1968   Kaizerban........................... 161/247
3,639,096   2/1972   Wright........................... 260/67.6 R Primary Examiner—George F. Lesmes
Assistant Examiner—James J. Bell
Attorney, Agent, or Firm—Thomas J. Morgan; Marvin Turken; Stephen D. Murphy

[57] ABSTRACT

Methylolated 2,7-dioxo-4,5-dimethyl-decahydropyrimido-[4,5-d]-pyrimidine, prepared by the reaction of formaldehyde with 2,7-dioxo-4,5-dimethyl-decahydropyrimido-[4,5-d]-pyrimidine, is laminated and/or used to impregnate substrate materials, such as paper, fabric, compressed wood, and the like, to make, for example laminated assemblies such as decorative, resinbonded, multi-layer structures.

23 Claims, No Drawings

AMINOPLAST-FORMALDEHYDE REACTION PRODUCTS AS LAMINATING RESINS

BACKGROUND OF THE INVENTION

The art of making resin laminates is well known and the uses for laminated board or panels are innumerable, the most popular uses being sink counter tops, bar tops, furniture tops, cabinet surfaces, wall coverings, and the like. These laminates are generally made up of a core comprising a plurality of phenolic resin-bonded Kraft paper plies with a superimposed, also resin-bonded, print sheet which permits masking of the usually unattractive core by the use of any number of artistic designs, colors, wood grain simulations, etc. The printed sheet, other than being attractive and able to act as a barrier against the possibility of phenolic resin migration, must be versatile and durable in the sense that it must be color stable, it must impart hardness to the laminate surface, and it must be solvent, impact and abrasion resistant.

In the past, these characteristics have been achieved by impregnating the print sheet with a melamine-formaldehyde resin; if desired, a minor amount of a formaldehyde condensate with another amino triazine may be present in combination with the malamine-formaldehyde resin.

Where very substantial wear is anticipated for the decorative laminate, such as is the case with counter tops, kitchen table tops, bar tops, and other like horizontal working surfaces, an overlay sheet of a good grade of alpha-cellulose paper impregnated much the same way the printed sheet is impregnated is applied to the outer surface of the printed sheet lamina, thus providing what is commonly referred to as a decorative overlay. In this way significantly greater wear can be tolerated without defacing the artistic design of the printed sheet layer and consequently the general appearance of the decorative laminated board or structure. Alternatively, an untreated printed sheet may be sandwiched between the core layer and an overlay lamina.

The impregnated core, print sheet and overlay sheet laminae assembled as described above can be cured at elevated pressures, typically from about 800 to about 1,500 pounds per square inch, and at elevated temperatures, generally from about 140°C. to about 145°C., for about 10 to about 20 minutes.

If post-formable properties are sought in the laminate assembly, it may be advantageous to undercure the core laminae and essentially completely cure the overlay lamina. Furthermore, certain or all of the core laminae may be made of phenolic resin impregnated creped Kraft paper in lieu of the conventional uncreped Kraft paper. Typical curing catalysts for the malamine-formaldehyde resin impregnated sheets are: organic acids and anhydrides, such as acetic, oxalic, benzoic of adipic acid, maleic anhydride, and the like; inorganic acids, such as hydrochloric, phosphoric, sulfuric, and like acids; etc.

One of the advantages to the use of high grade alpha-cellulose paper in the overlay sheet and, preferably, the print sheet is the fact that the paper becomes almost invisible in its matrix, i.e., it becomes essentially transparent. In the case of the printed sheet, virtually only the design shows through. Of course, it may be desirable under certain circumstances where the print design is fainter or lighter than usual to use a different grade of paper to provide extra covering power with respect to the core substrate.

An alternative method for providing a durable overlay is to use a two-step molding process wherein a partially cured, preformed sheet of clear melamine-formaldehyde resin having a predetermined thickness is made and then laminated with a melamine-formaldehyde resin impregnated printed sheet, the resulting laminae being superimposed on and boned to a resin-bonded Kraft paper core substrate or body layer as described hereinbefore.

Still another method involves the use of a decorated surface layer pigmented throughout as the sole exterior lamina, since pigmented sheets having no design imprinted sheets therein generally exhibit good abrasion resistance.

Obviously, there are a number of uses to which the body layer or core described above can be put which do not require a decorative lamina. These are well known, such as use as sheathing, backing, and the like, where structural and covering properties are paramount, appearance and wear being less significant.

By the same token, a print sheet, with or without a decorative overlay, may be mounted on a solid, non-laminated substrate of wood, thick plastic, plate glass, metal sheeting, or the like of aesthetic purposes. Likewise, the print sheet per se may be used as a durable picture, identification, or instruction card.

A laminating resin, within the purview of the present invention, is not only useful for preparing and bonding laminae but, particularly if it is clear and transparent, it has all the associate uses alluded to above as well as many others which will be obvious to the person skilled in the art. While the instant discovery, in the interest of clarity and consistent with statutory requirements, is defined with emphasis on certain specific embodiments thereof, it will indeed be quite apparent that the purpose of the present invention is to prepare novel decorated or undecorated laminae as well as laminated structures prepared therefrom.

DESCRIPTION OF THE INVENTION

The present invention relates to a novel laminating resin which is the reaction product of 2,7-dioxo-4,5-dimethyl-decahydropyrimido-[4,5-$d$]-pyrimidine and formaldehyde. More particularly, the instant discovery concerns the preparation of laminae and/or laminated assemblies, such as decorative, resin-bonded, multilayer structures, in which the laminating resin is methylolated 2,7-dioxo-4,5-dimethyl-decahydropyrimido-[4,5-$d$]-pyrimidine.

Typically, a sheet of high grade alpha-cellulose paper is impregnated with a resin-water solution in which the resin is the condensation product of 2,7-dioxo-4,5-dimethyl-decahydropyrimido-[4,5-$d$]-pyrimidine (hereinafter sometimes referred to as "aminoplast") and formaldehyde (HCHO), prepared as described hereinafter, and the resulting resin-rich, alpha-cellulose paper dried and heat cured under pressure, generally in the presence of an acid catalyst, to form a transparent resin sheet of lamina.

Also, typically, the just-described transparent sheet is used as the overlay sheet of a laminated assembly comprising a printed sheet (resin impregnated or not) sandwiched between the overlay sheet (decorative overlay) and a core layer prepared from multiple, superimposed sheets of Kraft paper impregnated with a phenolic resin and heat and pressure bonded to each other. If desired, where wear is not extensive, a printed sheet impregnated with the aminoplast-HCHO laminating resin of the present invention is the exterior lamina of a laminated assembly, i.e., the printed sheet is bonded to the just-described core or body layer.

Alternatively, of course, where a design is not need or wanted, pigmented alpha-cellulose paper impregnated with aminoplast-HCH0 resin may be heat cured under pressure to produce a durable lamina surface which is bonded to the core layer, thus providing a durable surface to the latter while at the same time masking it.

According to still another embodiment of the present invention, the core or body layer of a laminated assembly may be constructed of individual laminae impregnated and/or bonded by aminoplast-HCH0 resin. For example, Kraft paper sheets (creped or uncreped) may be impregnated with the methylolated aminoplast resin contemplated herein and heat cured and bonded to each other under pressure to prepare a rigid base member or core which is useful as such or may be used as the body layer of the decorative laminate assembly.

Of course, as suggested hereinbefore, a print sheet, with or without decorative overlay, of the methylolated aminoplast of the present invention may be mounted on various other substrates or body layers, e.g., plate glass, wood, metal sheeting, walls, etc., for aesthetic purposes. Alternatively, the resin-rich printed sheet per se, with or without overlay, may be used, for instance, as a picture, identification or instruction card. Rigidity may be built into the card or laminated structure by virtue of the thickness of the resin-rich print sheet itself or by the use of transparent overlay sheets and/or substrate laminae bonded to the print sheet.

Reactant 2,7-dioxo-4,5-dimethyl-decahydropyrimido-[4,5-$d$]-pyrimidine, (A), used to prepare the resin of the present invention is reported in 92 Monatschefte fuer Chemie 31 (1961) as a crystalline solid metling at 277°C. This material can be prepared by the acidactalysed reaction between acetaldehyde and urea in an aqueous menstruum. The ratio of the concentration of acetaldehyde to that of urea in the reaction system is at least about 1.5 and preferably between about 1.8 and about 2.2. The reaction is desirably conducted at atmospheric pressure and at an elevated temperature, preferably at a temperature of between about 50°C. and about 100°C., with the atmospheric reflux temperature of the reaction system being especially preferred.

The compound 2,7-dioxo-4,5-dimethyl-decahydropyrimido-[4,5-$d$]-pyrimidine, (A), suitable for use in the present invention is conveniently and preferably prepared according to the following procedure, it being understood, of course, that other methods of synthesis can be used without departing from the spirit of the invention. Thus, 5285 parts by weight (120 moles) of acetaldehyde are charged to a suitable conventional reaction vessel and cooled to below 20°C. Then a solution of 3,600 parts by weight (60 moles) of urea and 645 parts by weight of reagent grade sulfuric acid (98 percent) in 4,275 parts by weight of water are added dropwise with stirring to the acetaldehyde. During the addition, a suitable cooling means (e.g., an ice-bath) is applied to the reaction vessel, and the rate of addition is adjusted, if necessary, in in order to maintain the reaction system at a temperature of about 20°C. When the addition is complete, the reaction mixture is heated to atmospheric reflux temperature and maintained at that temperature for 1 hour. Thereafter, the reaction mixture is cooled to ambient temperature, diluted with water, and filtered to isolate the crystalline product, (A). The product is washed with water, then with methanol, and finally recrystallized from water. After drying the recrystallized product at 70°C., it weighs 1467 parts (25 percent of the theoretical yield based on urea) and melts at 275°–280°C. Elemental analysis of the product corresponds to the formula $C_8H_{14}N_4O_2$. The structural formula is:

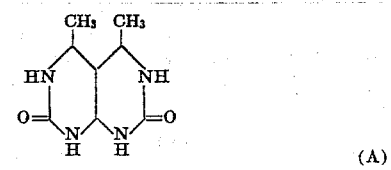

(A)

Methylolated 2,7-dioxo-4,5-dimethyl-decahydropyrimido-[4,5-$d$]-pyrimidine of the type contemplated herein can be represented by the following formula:

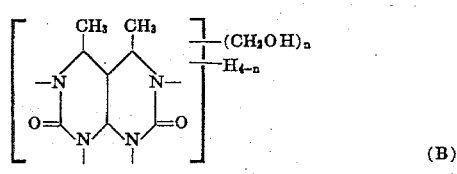

(B)

wherein $n$ is an integer from 1 to 4, inclusive.

The compounds represented by formula (B) are prepared from aminoplast (A) by reacting the latter with controlled amounts of formaldehyde. Useful products are obtained at aminoplast/formaldehyde molar ratios as low as about 1/0.8. However, ratios as high as 1/10 may also be used. By judicious selection of the proper molar ratios, resins of high or low degrees of methylolation may be obtained. Since the properties of the resins depend to a large degree on the amount of methylolation, this flexibility allows one to tailor-make resins to suit specific applications.

Generally, however, treatment of aminoplast, (A), with formaldehyde to produce the reacting products contemplated herein is accomplished by contacting (A) with between about 0.8 and about 10.0, preferably between about 2.80 and about 5.0, molar equivalents of formaldehyde in a hydroxylic medium. The hydroxylic solvent used should be capable of being separated from the resulting product (B) by evaporative means. The preferred solvent is water. The total concentration of the reactans in the hydroxylic medium is not critical.

In especially preferred processes, reaction is conducted using formalin, i.e., an aqueous solution of formaldehyde in which the concentration of formaldehyde is between about 35 and about 40 percent, or paraformaldehyde, an oligomer, as the HCHO source.

The reaction between aminoplast (A) and formaldehyde to form the methylolated aminoplast resins (B) of the present invention is catalysed by acid or base. Reaction can also be carried out without added catalyst. While the natural acidity of formalin, for example, is sufficient, reaction times are much longer. In effect, also, acidic pH's are created during the reaction by conversion of some of the $CH_2O$ to formic acid. In aqueous media, the reaction can be conducted at a pH of less than or greater than 7. Good results are achieved, for instance, at a pH greater than about 8 and less than about 12, say between about 9 and about 10.

The methylolation reaction contemplated herein proceeds well using a broad range of temperatures. For example, good results may be achieved at temperatures from about 35°C. to reflux, at atmospheric pressures. Elevated pressures, of course, would require higher temperatures; conversely, subatmospheric pressures would necessitate proportionately lower temperatures.

Typically, laminae of the type contemplated herein are prepared by first impregnating a substrate, e.g., alpha-cellulose paper, with an aqueous solution of the aminoplast-formaldehyde reaction product (B), with or without added acid curing catalyst, and drying the thus-treated paper. Suitable representative acid curing catalysts are the water-soluble organic and inorganic acids or inorganic acid salts which behave as so-called latent acid catalysts, e.g., ammonium chloride, magnesium chloride, zinc nitrate, and the like. Other acids which may be used as curing agents are Lewis acids, paratoluene sulfonic acid, acetic acid, formic acid, phosphoric acid, sulfuric acid, and other like organic and inorganic acid curing catalysts.

The concentration of curing catalyst may vary significantly from about 1 to about 50 percent, preferably from about 2 to about 15 percent, by weight of catalyst, based on the amount of resin.

Resin curing temperatures may vary considerably. Typically, an aqueous methylolated aminoplast resin (B) containing about 4 percent by weight curing catalyst, based on the amount of resin, is prepared, the amount of resin in the water solution being, by weight, from about 5 percent to about saturation at ambient temperature, preferably from about 15 percent to about 60 percent by weight of the total water-resin mixture. A sheet of alpha-cellulose paper is dipped in the solution mixture until it is well impregnated, the thus-impregnated sheet air dried and compressed in a laminating press at temperatures in the range of about 135°C. and about 220°C., preferably between about 150°C. and about 200°C., at pressures in the range of about 15 psi and about 200 psi, preferably between about 25 psi and about 150 psi. Of course, when laminating a greater number of sheets substantially higher pressures, e.g., from 200 to 1,500, are used, as will be seen hereinafter.

Hereinabove described are monomeric resins of methylolated 2,7-dioxo,4,5dimethyl-decahydropyrimido-[4,5-d]-pyrimidine which, as will be seen hereinafter, are very useful for preparing the laminae of the present invention. Polymeric derivatives of the monomeric resins may similarly by used to provide laminae of the type contemplated herein. In situ polymerization of the reaction products (B) may be accomplished during the preparation of the latter by adding additional amounts of acidic catalysts to maintain the pH at a level of about 3.0 to about 5.0 and continuing the aminoplast (A)/HCHO reaction at reflux for extended periods of time until the desired viscosity is attained. Alternatively, polymerization may be attained at lower temperatures, say between about 30°C. and about 60°C., by maintaining lower pH values, e.g., between about 1.5 and about 2.5, for extended periods of time. Of course, these temperature ranges are modified proportionately if superatmospheric or subatmospheric pressures are used. Generally, polymerization to relatively high viscosity is effected within about 6 hours at the higher temperatures and within about 12 to about 16 hours at the lower temperatures.

For best results, the polymeric resin is blended and cured under essentially the same conditions and concentrations described above and hereinafter for monomeric resins of compound (B). Generally, lower concentrations of polymeric resin are needed to realize satisfactory impregnations or resin pick-up in substrates such as alpha-cellulose paper. Good results are achieved using from about 15 percent to about 35 percent, preferably between about 20 percent and 25 percent, polymeric resin by weight, based upon the total weight of the water-resin mixture.

The present invention will best be understood from the following examples which are merely illustrative and not intended to unduly limit the scope of the present invention (parts and percentages recited in the examples are by weight, unless otherwise indicated):

EXAMPLE I

To a reaction flask is charged 715 grams of formalin (37 percent "uninhibited"). To this is added 1,740 grams of 2,7-dioxo-4,5-dimethyl-decahydropyrimido-[4,5-d]-pyrimidine with stirring, thus providing a (A):HCHO molar ratio of 1.1. Good stirring is provided by the simultaneous addition of water, 800 grams thereof being needed. The resulting mixture, a thick white paste, has a temperature of 25°C. Heat is applied such that the mixture reaches 85°C. in 15 minutes and 102°C. (reflux) after a total of 25 minutes. The temperature is maintained at reflux for about 5¾ hours, after which the reaction mixture is cooled to room temperature and filtered to remove undissolved solids.

On standing for several days, the filtrate containing product methylolated 2,7-dioxo-4,5-dimethyl-decahydropyrimido-[4,5-d]-pyrimidine (B) pates out, has a pH of 8.2, and contains 50.0 percent solids.

EXAMPLE II

To a suitable reaction vessel equipped with conventional agitation means are charged 239 grams (2.94 moles) of 37 percent formalin ("uninhibited") and 15 grams of a 10 percent aqueous solution of sodium carbonate. To the resulting mixture is added, with agitation, 198 grams (1.0 mole) of crystalline aminplast (A). The reaction mixture, which has a pH of between about 9 and about 9.5, is heated to reflux temperature over the course of about 20 minutes and maintained at the reflux temperature for about 15 minutes. The reaction mixture is then cooled to ambient temperature, the pH is adjusted to 7.0, and the reaction mixture filtered to remove insolubles. The clear filtrate contains 2.8 percent free formaldehyde as determined by the "sodium sulfite method" described in Walker, Formaldehyde, 3d ed., p. 486 (Rheinhold Publishing Corporation New York, N.Y., 1964). The concentration of reaction product (B) in the aqueous filtrate is 60 percent by weight as determined gravimetrically, i.e., by evaporating an aliquot sample of the solution at 70°C. for 6 hours and weighting the residue.

EXAMPLE III

This example illustrates still another variant of the procedure used in Example II, above, to produce methylolated 2,7-dioxo-4,5-dimethyl-decahydropyrimido-[4,5-d]-pyrimidine.

To a suitable reaction vessel equipped with conventional agitation means are charged 4,055 grams (50 moles) of 37 percent formalin ("uninhibited") and 150 grams of a 10 percent aqueous solution of sodium carbonate. To the resulting mixture is added, with agitation, 1,980 grams (10 moles) of crystalline aminoplast (A). The reaction mixture is then heated to reflux temperature for 5 minutes and cooled to ambient temperature. An additional charge of 150 grams of 10 percent aqueous sodium carbonate and 1386 grams (7 moles) of aminoplast (A) are added and the reaction mixture is again heated to reflux temperature and maintained thereat for 30 minutes. Upon recooling to reaction mixture to ambient temperature, neutralizing the pH, and filtering, a solution of reaction product (B) is obtained which contains 2.7 percent unreacted formaldehyde.

EXAMPLE IV

Polymeric methylolated 2,7-dioxo-4,5-dimethyl-decahydropyrimido-[4,5-d]-pyrimidine is prepared following essentially the process of Example I, above, with the following exceptions:

| FORMULATION | GRAMS |
|---|---|
| 1. Aminoplast (A) | 396 |
| 2. Formalin (37% "uninhibited") | 486 |
| 3. H₂O | 100 |
| [(A):HCHO molar ratio = 1:3] | |

EXAMPLE V

An aqueous solution of the reaction product prepared in Example I, above, is prepared containing, by weight, 50 percent resin and 50 percent water. Two sheets of pigmented alpha-cellulose paper are separately dipped into the aqueous solution to impregnate the sheets which are then separately air dried.

A substantially pure grade of alpha-cellulose paper is likewise dipped in the 50/50 aqueous solution of reaction product and then air dried.

A laminated assembly is made from the two base sheets of impregnated pigmented alpha-cellulose paper, a print sheet which is a magazine page having printed on one side thereof a multicolored design, and an overlay sheet, viz., the impregnated substantially pure grade of alpha-cellulose paper. The assembly of these sheets is in the order as listed, the printed design side of the magazine page facing the last-mentioned lamina of pure greade alpha-cellulose paper.

The laminated assembly is compressed in a laminating press at 100 psi at a temperature of 180°C. for about 10 minutes.

The resulting laminated product is a resin-bonded unitary structure clearly showing the color print on one side thereof through a glossy and very smooth overlay sheet, the overlay sheet having, so to speak, essentially disappeared or been converted to a clear film.

| TIME | TEMP °C. | REMARKS | |
|---|---|---|---|
| 9:00 | Room Temp. | Charge 1, 2 and 3 to reactor and heat to reflux | |
| 9:40 | 99 | Refluxing; | white paste |
| 10:10 | 101 | do. | pH 4.7; clear, add aqueous formic acid HOH/FA) to pH 4.0 |
| 10:40 | 100 | do. | pH 4.6; add HOH/FA to pH 4.1 |
| 11:10 | 100.5 | do. | pH 4.7; add HOH/FA to pH 4.1 |
| 11:40 | 101 | do. | pH 4.3; add HOH/FA to pH 4.1 |
| 12:40 | 101 | do. | pH 5.8; add HOH/FA to pH 4.2 |
| 1:40 | 101 | do. | pH 5.6; add HOH/FA to pH 4.1 |
| 2:40 | 101 | do. | pH 5.6; add HOH/FA to pH 4.2 |
| 3:40 | 101 | do. | pH 5.8; add HOH/FA to pH 4.2 |
| 4:55 | 101 | do. | pH 5.8; add triethanolamine (100%) to pH 7.2; drop heat and cool |

The resulting product, polymeric methylolated 2,7-dioxo-4,5-dimethyl-decahydropyrimido-[4,5-d]-pyrimidine, 55.3 percent solids, has a viscosity of 1,030 centipoises.

EXAMPLES VI THROUGH IX

Example V is repeated in every essential respect, excepting as shown in the following tables:

TABLE I

| | (A):HCHO RESIN PREPARATION | | LAMINA IMPREGNATION | | |
|---|---|---|---|---|---|
| Example No. | Ratio of (A):HCHO (molar) | Process of Example No. | impregnating Resin/H₂O Solution (%) | Curing Catalyst | Curing Catalyst Concentration (%) |
| VI | 1:5 | I | 35/65 | none | — |
| VII | 1:8 | II | 25/75 | M₄Cl₂ | 5 |
| VIII | 1:4 | III | 60/40 | H₂SO₄ | 11 |
| IX | 1:3.5 | IV | 22/78 | none | — |

TABLE II

| Example No. | Headrule Overlay (impregnated) | LAMINATED ASSEMBLY PREPARATION | | | | |
|---|---|---|---|---|---|---|
| | | Core (impregnated) | Temp. (°C.) | Compression Pressure (psi) | Time (minutes) | |
| VI | 1 sheet high grade alpha-cellulose paper | 5 sheets standard Kraft | 160 | 820 | 17 | |
| VII | none - impregnated color print sheet only | 12 pigmented alpha-cellulose sheets | 170 | 430 | 13 | |
| VIII | 1 sheet pure grade alpha-cellulose | 4 sheets standard Kraft interspersed with 3 sheets standard creped Kraft | 195 | 1100 | 20 | |
| IX | 1 sheet pure grade alpha-cellulose paper | 1 sheet pure grade alpha-cellulose | 140 | 35 | 7 | |

Pursuant to statutory requirements, there are described above the invention and what are now considered its best embodiments. It should be understood, however, that the invention can be practiced otherwise than as specifically described, within the scope of the appended claims.

What is claimed is:

1. A resinous lamina sheet of methylolated 2,7-dioxo-4,5-dimethyl-decahydropyrimido-[4,5-d]-pyrimidine resin.

2. The resinous lamina sheet of claim 1 wherein the resin has the formula (B):

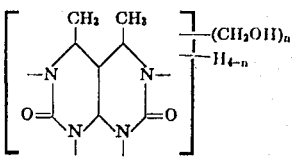

wherein n is an integer from 1 to 4, inclusive.

3. A cured, resinous lamina comprising a fibrous sheet impregnated with methylolated 2,7-dioxo-4,5-dimethyl-decahydropyrimido-[4,5-d]-pyrimidine resin of the formula (B):

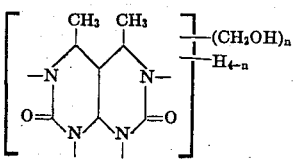

wherein n is an integer from 1 to 4, inclusive.

4. The cured, resinous lamina product of claim 3 wherein the fibrous sheet is alpha-cellulose paper.

5. The cured, resinous lamina product of claim 3 wherein the fibrous sheet is pigmented alpha-cellulose paper.

6. The cured, resinous lamina product of claim 3 wherein the fibrous sheet is Kraft paper.

7. The cured, resinous lamina product of claim 3 wherein the fibrous sheet has printing thereon which is visible through the impregnating resin.

8. A clear, transparent cured resinous lamina product of claim 4 wherein the fibrous sheet is essentially pure grade alpha-cellulose paper.

9. A laminated assembly comprising a core layer having superimposed thereon and firmly bonded thereto a cured, resinous overlay sheet of methylolated 2,7-dioxo-4,5-dimethyl-decahydropyrimido-[4,5-d]-pyrimidine resin of the formula (B):

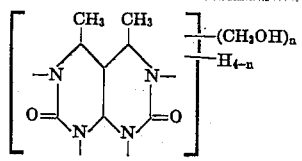

wherein n is an integer from 1 to 4, inclusive.

10. The laminated assembly of claim 9 wherein the superimposed bonded lamina is a fibrous sheet impregnated with the resin of formula (B).

11. The laminated assembly of claim 10 wherein the fibrous sheet is essentially pure grade alpha-cellulose paper.

12. The laminated assembly of claim 9 wherein sandwiched between and firmly bonded to the core layer and the overlay sheet is a print sheet bearing an image or other printed matter on the side of the print sheet in contact with the overlay sheet.

13. The laminated assembly of claim 12 wherein the print sheet is impregnated with a resin of the formula (B).

14. The laminated assembly of claim 12 wherein the overlay sheet is an essentially pure grade alpha-cellulose paper sheet impregnated with a resin of the formula (B).

15. The laminated assembly of claim 14 wherein the core layer is made up of a plurality of plies of fibrous sheets impregnated with resin of formula (B), the multi-layered assembly forming a cured, resinous unitary laminated structure having a clear, transparent overlay sheet through which the image or printed matter in the print sheet is visible.

16. The process which comprises impregnating a fibrous sheet with an aqueous solution of a methylolated 2,7-dioxo-4,5-dimethyl-decahydropyrimido-[4,5-d]-pyrimidine resin, drying the thus-treated sheet and subjecting the resulting resin-impregnated sheet to the action of heat and pressure to cure the resin and form a lamina.

17. The process of claim 16 wherein the fibrous sheet is alpha-cellulose paper.

18. The process of claim 16 wherein the fibrous sheet is Kraft paper.

19. The process of claim 16 wherein heating and compression are carried out in the presence of a resin curing catalyst.

20. The process of claim 16 wherein a cured, unitary laminated assembly is made from multi-layers of the resin-impregnated fibrous sheets by subjecting said layers to the action of heat and pressure to cure the resin and bond lamina layers.

21. The process of claim 16 wherein the methylolated 2,7-dioxo-4,5-dimethyl-decahydropyrimido-[4,5-d]-pyrimidine has the formula (B)

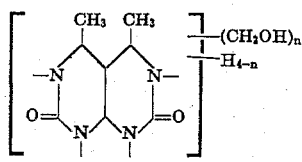

wherein $n$ is an integer from 1 to 4, inclusive.

22. The process of claim 20 wherein the outermost layer is essentially pure grade alpha-cellulose impregnated with 2,7-dioxo-4,5-dimethyl-decahydropyrimido-[4,5-d]-pyrimidine resin to form an overlay sheet, and sandwiched between said overlay sheet and the remaining multi-layer core is a print sheet, the resulting structure being a cured, resinous unitary laminated assembly having a clear, transparent overlay sheet through which the print sheet is visible.

23. The process of claim 22 wherein the resin has the formula (B)

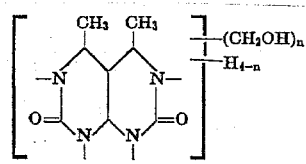

wherein R is an integer from 1 to 4, inclusive.

* * * * *